Oct. 27, 1959    A. SÄLZER ET AL    2,910,557
SPRING TENSIONING MECHANISMS
Filed April 5, 1957    6 Sheets-Sheet 1

ALBERT SÄLZER
HEINRICH HENKEL
INVENTORS
by Irwin S. Thompson
ATTORNEY

Oct. 27, 1959     A. SÄLZER ET AL     2,910,557
SPRING TENSIONING MECHANISMS

Filed April 5, 1957     6 Sheets-Sheet 4

Inventors
ALBERT SALZER
HEINRICH HENKEL
BY Irwin S. Thompson
ATTY.

Oct. 27, 1959 A. SÄLZER ET AL 2,910,557
SPRING TENSIONING MECHANISMS
Filed April 5, 1957 6 Sheets-Sheet 5

ALBERT SÄLZER
HEINRICH HENKEL
INVENTORS
by Irwin S. Thompson
ATTORNEY

Oct. 27, 1959 A. SÄLZER ET AL 2,910,557
SPRING TENSIONING MECHANISMS
Filed April 5, 1957 6 Sheets-Sheet 6

ALBERT SÄLZER
HEINRICH HENKEL
INVENTORS
by Irwin S. Thompson
ATTORNEY

United States Patent Office 2,910,557
Patented Oct. 27, 1959

2,910,557

SPRING TENSIONING MECHANISMS

Albert Salzer, Geisweid, and Heinrich Henkel, Dortmund, Germany, assignors to Friedrich Uhde G.m.b.H., Dortmund, Germany, a body corporate of Germany Application April 5, 1957, Serial No. 650,875

Claims priority, application Germany April 28, 1956

6 Claims. (Cl. 200—74)

The invention relates to spring tensioning mechanisms, especially for driving switches serving for the switching of very high currents, for example, contact switches comprising a plurality of partial switches and having large contact surfaces for electrolysis cells requiring to be short-circuited.

Contact switches of this kind have hitherto been switched either manually or by compressed air or oil-operated actuating devices. Since very great switching forces are required in contact switches of this kind, each individual partial switch of the contact switch has to be operated by a separate operator when contact switches of this kind are operated manually. Switch operation of this kind is very complicated and time-consuming and, in addition, the individual partial switches cannot be operated with the requisite synchronism, so that the contacts of the switches burn at the relatively high current intensities.

Operating the contact switches by means of compressed air- or oil-switching devices entails a complicated and therefore very expensive installation.

The present invention provides a spring tensioning mechanism which enables a plurality of partial switches forming a contact switch to be controlled from a central point.

The above described disadvantages are obviated according to the invention primarily by tensioning two spring elements or groups of spring elements by turns, said spring elements or groups of elements acting on a switch shaft through a suitable mechanism. Said spring elements or groups of spring elements are at the same time so provided that the first of the spring elements or the first of the groups of spring elements imparts a switching movement in one direction to the switch shaft after the second of the spring elements or the second group of spring elements has been tensioned through a gear. The second spring element or the second group of spring elements can impart a switching movement in the opposite direction to the switch shaft after a gear locking means has been disengaged, while at the same time this second spring element or the second group of spring elements can return the first spring element or the first group of spring elements into the tensioned position.

In further development of the principle of the invention it is proposed to allow one of the spring elements or one of the groups of spring elements in the tensioned state to act directly on a crank throw of the switch shaft which crank throw is at a dead center position to the direction of the spring force. The second of the spring elements or the second of the groups of spring elements can at the same time be operatively connected to a tensioning mechanism, by whose drive the second spring element or the second group of spring elements can be brought by constraint into its tensioned position. Before the conclusion of the tensioning movement of the tensioning mechanism the said tensioning mechanism co-operates with the switch shaft through a coupling and an intermediate gear, so that the switch shaft undergoes a partial rotation. By the partial rotation of the switch shaft its crank throw can be moved out of the dead center position, whereby the first spring element or the first group of spring elements turns the switch shaft by displacement force in a direction such that lifting of the switch contacts from the contact bars of the contact switch is effected by constraint.

According to a further feature of the invention a locking means may be operatively connected to the tensioning mechanism, said locking means securing the tensioning mechanism against movement when the second spring element or group of spring elements is tensioned. By releasing this locking means the tensioning mechanism is released so that the spring element or group of spring elements operatively connected to said mechanism imparts to said gear a switching movement opposed to the tensioning movement. This switching movement can at the same time be made to act on the switch shaft by a displacement force through the clutch and the intermediate gear, whereby the switch contacts of said switch shaft are short-circuited by constraint with the contact bars of the contact switch. At the same time, the displacement force of the second spring element or of the second group of spring elements is such that it is possible simultaneously to overcome the displacement force of the first spring element or first group of spring elements, which is directed in opposition to the displacement force of the second spring element or group of spring elements, and thus in consequence of the turning of the crank throw the first spring element or the first group of spring elements at a dead angle to the crank throw acts on the latter under tension.

A further development according to the invention comprises constructing the tensioning mechanism, with which the second spring element or the second group of spring elements can cooperate, as a pawl and ratchet, on whose ratchet wheel a lever is eccentrically articulated, the spring element or elements or group of spring elements acting on the free end of the lever while the spring element or group of spring elements may be anchored to a supporting structural part.

According to the invention it is also proposed to associate with the ratchet wheel a hand lever which can cooperate with the ratchet teeth of the ratchet wheel by means of a control pawl in such manner that the ratchet wheel can be turned and the spring element or group of spring elements be initially tensioned through the lever articulated on the ratchet wheel, by moving the hand lever intermittently for example. At the same time, a locking pawl may cooperate with the ratchet wheel and automatically hold the ratchet wheel locked in its particular position. According to another feature of the invention the ratchet wheel of the pawl and ratchet is provided with a coupling dog, which directly before the end of the tensioning movement of the pawl and ratchet gear, can cooperate with a coupling dog of an intermediate device constructed as a two-throw crank gear. The two-throw crank gear thus receives a partial rotation imparted by the ratchet wheel of the pawl and ratchet gear. At the same time, according to the invention it is advantageous for the coupling dog to be provided on one crank of the two-throw crank device, while its other crank is held on the switch shaft so that the partial rotation transmitted to the two-throw crank device through the dog coupling by the pawl and ratchet device can act by constraint on the switch shaft.

It is further proposed according to the invention that the switching movement of the switch shaft produced by the first spring element and immediately following the partial rotation of said switch shaft should produce a movement of the two-throw crank device such that the coupling dog mounted on the one crank turns relative to the coupling dog provided on the pawl and ratchet and comes into cooperation with this coupling dog on the opposite side.

For the structural embodiment of the apparatus according to the invention it is further proposed so to construct the coupling that it can impart to the switch shaft through the two-throw crank device a switching movement directed in opposition to the first switching movement, after the locking pawl has been disengaged from the ratchet wheel of the tensioning mechanism and the ratchet wheel is moved in the direction opposed to its tensioning movement direction under the force of the second spring element or the second group of spring elements.

The invention further comprises arranging the group of spring elements acting on the crank throw of the switch shaft to consist of one spring element while the group of spring elements operatively connected with the tensioning mechanism gear has two spring elements. The spring elements of the two groups of spring elements are formed by tension springs.

The invention further comprises holding the control pawl, which is articulated on the hand lever, in operative connection with the control teeth of the ratchet wheel by means of a spring, while the locking pawl cooperating with said ratchet wheel is likewise operatively connected with the teeth of the ratchet wheel by a spring.

Finally, according to the invention it is also proposed to disengage the locking pawl from the control teeth of the ratchet wheel by hand or by remote control by means of an electromagnet or the like.

The invention will now be described in greater detail with reference to the drawing which illustrates the invention by way of example and in which.

Fig. 8 again shows a similar view shortly after the transmission of the switch release movement of the switch shaft.

Figure 9:
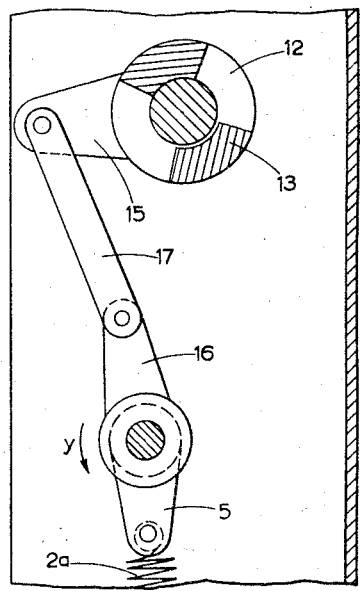

Fig. 9 shows also a similar view but with the spring tensioning mechanism at the moment of the completion of the released switch movement of the switch shaft.

Figure 6:
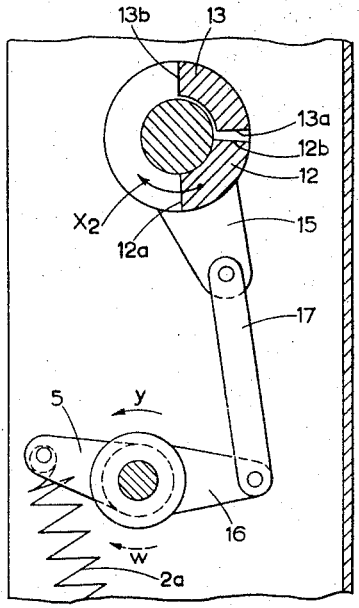
Fig. 6 shows a view in section of the spring tensioning mechanism according to Figs. 4 and 5 with the tensioning mechanism not operated.
Figure 10:
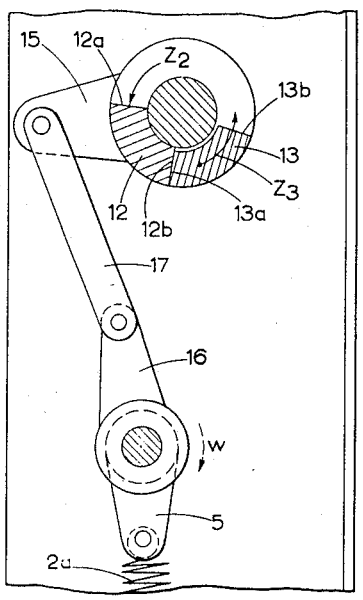
Figure 11:
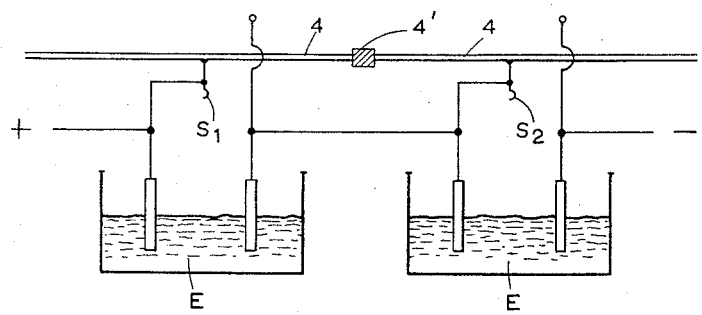

Fig. 10 shows still a similar view but shortly after the release of the pre-tensioned tensioning mechanism gear at the moment of the operative connection between the pawl ratchet mechanism and the switch shaft for the purpose of returning the switch shaft to the starting position shown in Fig. 6; and Fig. 11 shows a circuit arrangement of electrolysis cells operated by the spring tensioning mechanism of the invention.

As will be seen from Figures 1 to 10 of the drawing, the spring tensioning mechanism 1 according to the invention, which is intended especially for driving electric switches serving to switch very high currents, comprises two groups 2, 3 of spring elements, of which the group 2 consists of a spring element constructed as a tension spring 2a and is capable of imparting to the switch contacts a switching movement to bring them into the open position, while the spring element group 3 comprises two tension spring elements 3a, 3b and is arranged to bring the switch contacts of the contact switch into their short-circuit position and simultaneously pre-tension the spring element group 2.

Each of the spring element groups 2, 3 is fastened to a support W1, W2, and the spring element group 2 cooperates with a switch shaft 4 through a crank throw 5 provided on the latter. The spring element group 3 is fastened by its free end to a lever 6, through which it is in operative connection with a tensioning mechanism 7. The tensioning mechanism 7 of the spring tensioning mechanism is constructed as a pawl and ratchet and comprises essentially a ratchet wheel 8, a tensioning mechanism control lever 9 which is brought into driving connection with said ratchet wheel 8 through a control pawl 10, and a locking pawl 11 cooperating with the control teeth of the ratchet wheel 8. The tensioning lever 6 of the spring element group 3 is concentrically articulated on the ratchet wheel 8 of the tensioning mechanism gear 7. The ratchet wheel 8 of the tensioning mechanism gear 7 has a coupling dog 12, which is capable of cooperating with a second coupling dog 13, which is provided on a crank 15 of an intermediate device constructed as a two-throw crank 14. The two-throw crank 14 is in force-closed driving connection with the switch shaft 4 of the spring tensioning mechanism 1 by means of the crank 16 through the medium of a connecting member 17.

The mode of operation of the spring tensioning mechanism 1 according to the invention is as follows:

By means of the tensioning mechanism hand lever 9 the ratchet wheel 8 is turned in the direction of the arrow $X_2$ (Figures 1 and 6) through the control pawl 10. During this the locking pawl 11 engages under the force of the spring 18 in the control teeth of the ratchet wheel 8. Through the movement of the ratchet wheel 8, the lever 6 articulated concentrically thereon is shifted and the spring element group 3 is tensioned in the direction of the arrow X. The tensioned position of the spring element group 3 is reached when the spring tensioning mechanism 1 is in the working position shown in Figure 1.

If the hand lever 9 is now swung upward by a further amount, the locking pawl 11 engages in the next tooth of the ratchet wheel 8. Through the last partial movement of the ratchet wheel the coupling dog 12 provided thereon comes into operative connection with the coupling dog 13 of the intermediate device 14 whereby a partial rotation in the direction of the arrow $X_3$ is imparted to the crank 15 of the intermediate device 14. The crank 15 transmits this partial rotation through a connecting structural part 17 to the crank 16 of the intermediate device 14 in such manner that the said crank 16 undergoes a partial rotation in the opposite direction y. Since the crank 16 of the two-throw crank gear 14 is in force-closed driving connection with the switch shaft 4, the switch shaft has a corresponding partial rotation tramitted to it.

Before the partial rotation in the direction of the arrow y is imparted to the switch shaft by the two-throw crank gear 14, the crank throw 5 of the switch shaft 4 is at a dead center position relative to the direction of the spring force of the tension spring 2a of the spring element group 2. By the partial rotation of the switch shaft 4 the crank throw 5 of the latter is moved out of the dead center position, while the tension spring 2a of the spring element group 2, immediately following the partial rotation of the switch shaft, receives a rotary switching movement by which the switch contacts S1, S2 and so on, in force-closed driving connection with the switch shaft 4, are moved out of the short-circuit position shown in Figure 1 into the open position shown in Figures 2 and 11. As will be seen from the drawings, the contact switches are provided as bridging switches on electrolysis cells E.

Figure 2:
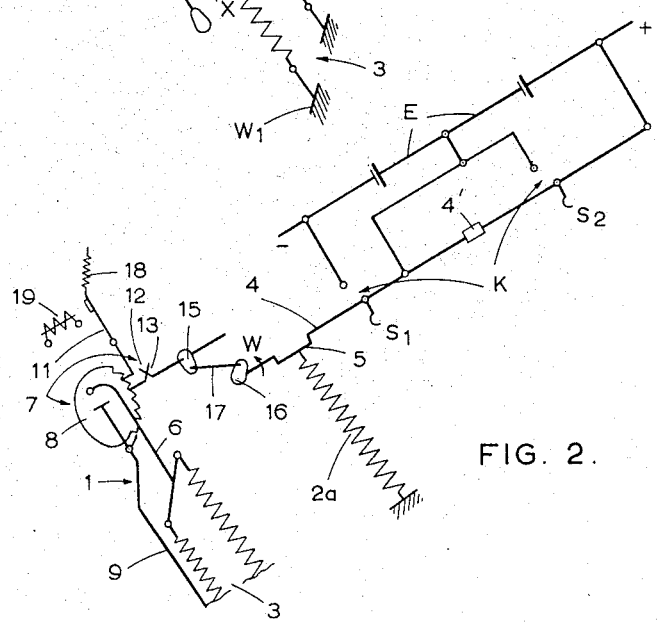
Figure 2 shows the spring tensioning mechanism according to Figure 1, likewise in perspective, in a working position in which the contact switch has been broken.

As will be seen from Figure 2 of the drawing, when the switch contacts $S_1$, $S_2$ are in the open position the tension springs $3a$, $3b$ of the spring element group 3 are kept in the tensioned state by the tensioning mechanism 7, while the tension spring $2a$ of the spring element group 2 is relaxed. It will further be seen from Figure 2 that the coupling dogs 12, 13 are at the same time operatively connected to one another. In this working position the spring tensioning mechanism 1 is ready to bring the switch contacts S, S2 into their short-circuit position in the event of disturbances in the electrolysis cell E.

Figure 1:
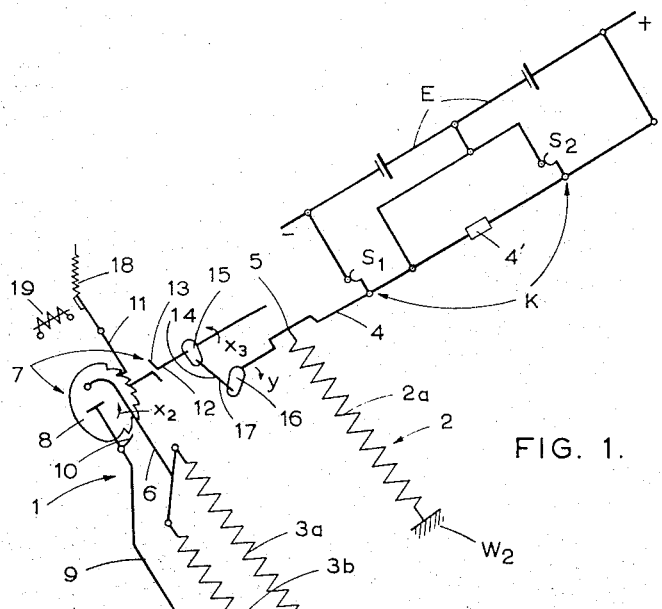
Figure 1 is a perspective view of a spring tensioning mechanism made in accordance with the invention in a switching position shortly before the contact switch is broken.
Figure 3:
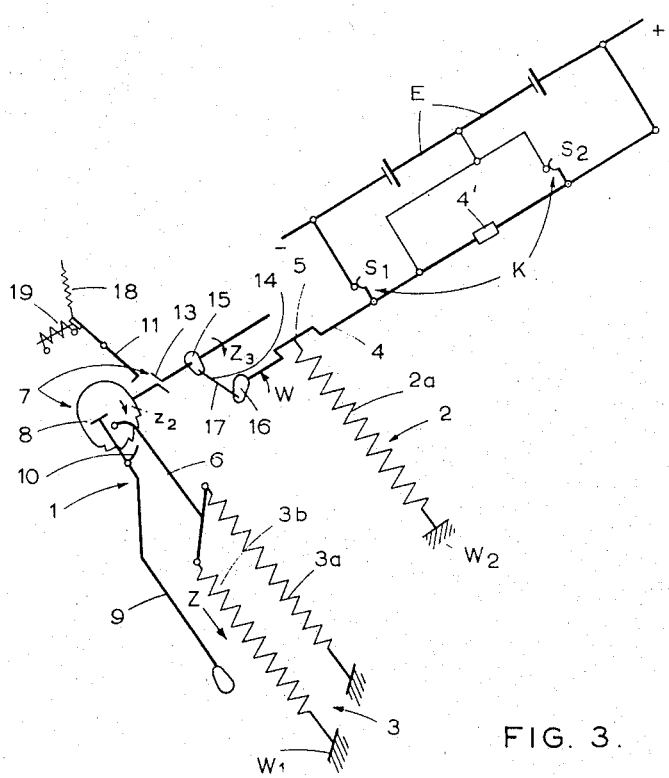
Figure 3 is an illustration, corresponding to Figures 1 and 2, when the contact switch is short-circuited.

If the electrolysis cell E breaks down due to an operating fault, then the locking pawl 11 cooperating with the ratchet wheel 8 of the tensioning mechanism 7 can be disengaged from the teeth of the ratchet wheel against the force of the spring 18, by hand or, as shown in Figures 1 to 3 of the drawing, by an electromagnet 19. As a result of the fact that the locking pawl 11, which serves as a locking means, releases the ratchet wheel 8, the latter is turned in the direction of the arrow $Z_2$ in Figure 3 of the drawing under the action of the tension springs $3a$, $3b$ of the spring element 3 through the lever 6, and the tension springs $3a$ of the spring element group 3 are relaxed in the direction of Z. The rotation $Z_2$ performed by the ratchet wheel under the action of the force of the spring element group 3 in opposition to the tensioning movement $X_3$ is transmitted to the intermediate device 14 through the coupling dog 12 provided on the ratchet wheel and the coupling dog 13 provided on the intermediate device. At the same time, the crank 15 of the latter is turned in the same direction $Z_3$ and transmits to the crank 16 through the connecting structural part 17 a movement in the direction of the arrow W, this rotary movement being opposed to the rotary movement y. The rotary movement W is at the same time transmitted to the switch shaft 4, so that the crank throw 5 of the latter is moved out of the position shown in Figure 2 into the position shown in Figure 3, this position of the switch corresponding to the position of the switch shown in Figure 1.

The working position of the spring tensioning mechanism 1 as shown in Figure 3 of the drawing shows the spring element group 3 in the unoperated condition in which the springs 3 are not in tension, while the spring element group 2 is again brought into its tensioned position. In this figure the switch contacts S1, S2 are in the short-circuit position.

After the operating fault on the electrolysis cell E has been cleared, the contact switch K formed by the switch contacts S1, S2 can be brought into its open position again. To this end the spring tensioning mechanism 1 is brought out of the working position shown in Figure 3 into the working position shown in Figure 1 by operation of the hand lever 9. Shortly before the end of the tensioning movement of the spring element group 3, the change-over process described hereinabove into the working position shown in Figure 2 takes place automatically. In order to prevent the control pawl 10 mounted on the hand lever 9 from coming into operative connection with the teeth of the ratchet wheel 8 when the latter is moved out of the position shown in Figure 2 into that shown in Figure 1, a bolt (not shown) is provided which moves the control pawl 10 out of the range of the ratchet wheel 8 against the force of a spring (also not shown) when the lever 10 is in the bottom position.

Figure 4:
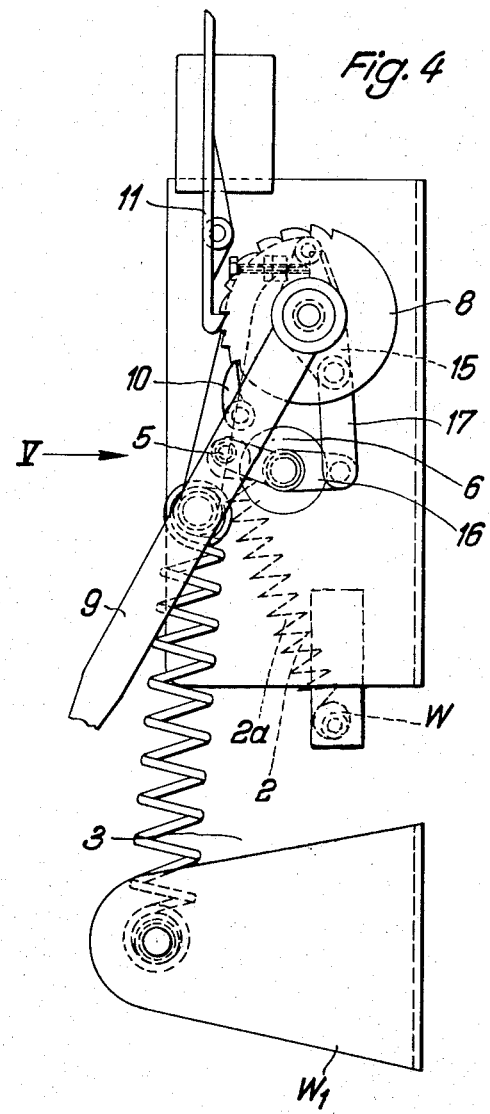
Figure 4 is a detailed side elevation of the spring tensioning mechanism according to Figures 1 to 3.
Figure 5:
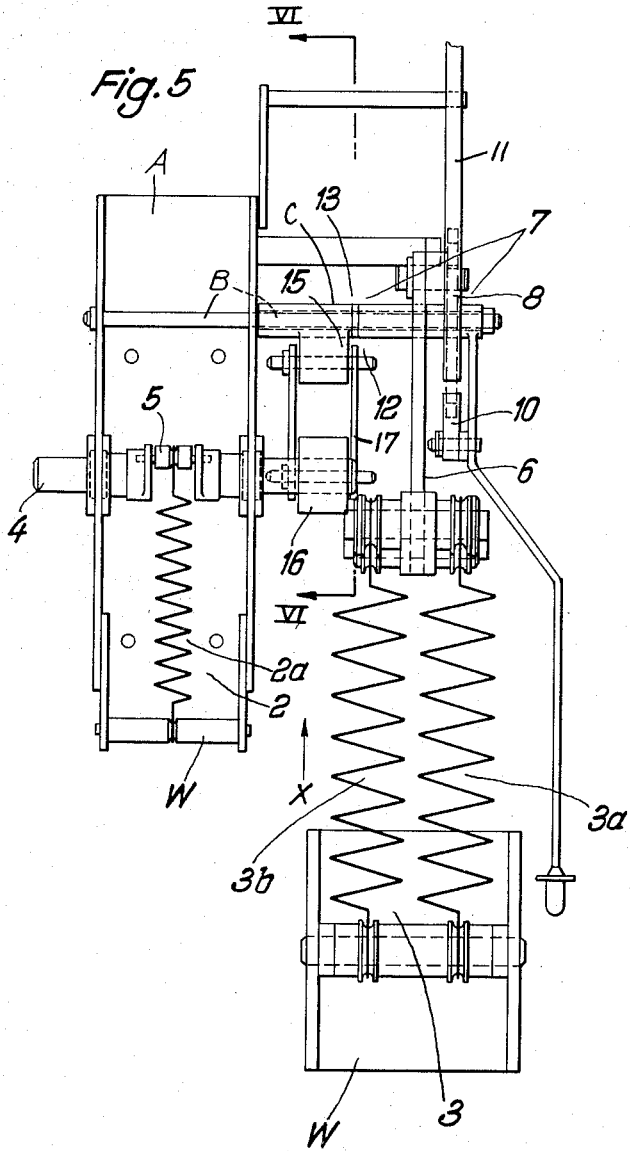
Figure 5 is a view in the direction of the arrow V of the spring tensioning mechanism according to Figure 4.

The spring tensioning mechanism according to the invention is illustrated in greater detail and provided with references in Figures 4 and 5 of the drawing.

Fig. 4 shows in side elevation and Fig. 5 in a view from above the spring tensioning mechanism in the working position corresponding to Fig. 1, in which both the spring element group 2 and the spring element group 3 are pre-stressed.

Figs. 6 to 10 of the drawing show the relative positions of the two clutch claws 12, 13 in relation to one another during various working stages of the spring tensioning mechanism. The clutch claws 12, 13 are formed, for example, by projections in the form of a segment of a circle, which in each case enclose approximately an angle of 90° and which are capable of performing a movement about an axis coinciding with the centre point of the segment.

Figure 7:
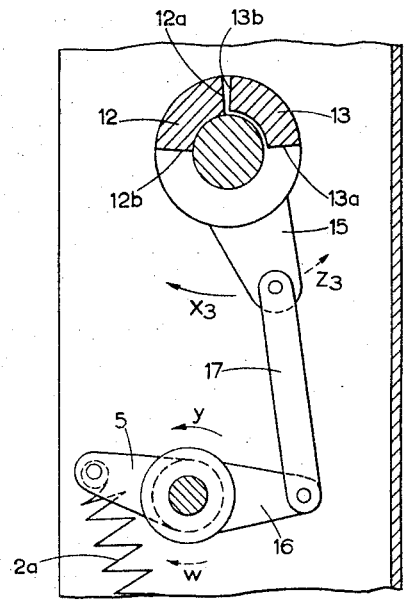
Fig. 7 shows a view corresponding to Fig. 6 with the tensioning mechanism operated and shortly before transmission of a switch release movement to the switch shaft.
Figure 8:
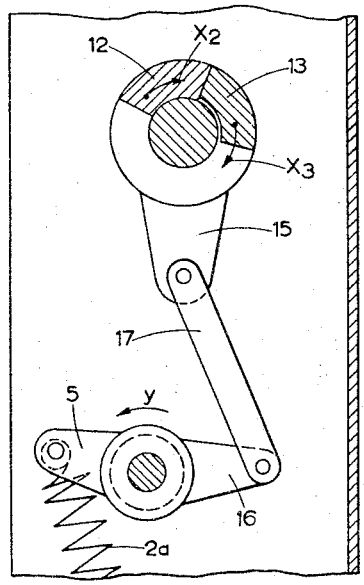

Fig. 6 shows the clutch claws 12, 13 in a position in which the spring element $2a$ of the spring element group 2, under tension, bears on the crank 5 of the switch shaft 4 in such manner that the direction of the force of the spring $2a$ assumes a dead center position in relation to the crank, that is to say, the spring $2a$ is not able to turn the switch shaft in the direction of the arrow y, although the clutch claw 12 of the tensioning mechanism gear 7 would permit this when brought out of the position of rest shown in Fig. 6, in the direction of the arrow $X_2$, by operation of the tensioning mechanism gear 7, into the position shown in Fig. 7, while in the basic position of the clutch claw 12 which is shown in Fig. 6 and coincides with the basic position of the ratchet wheel 8, as shown in Fig. 3, the springs $3a$, $3b$ of the spring element group 3 (Figs. 4 and 5) are not under pre-stressing; they are pre-stressed by way of the ratchet gear 7 when the clutch claw 12 is in the relative position (Fig. 7), rocked through 180° out of the basic position in the direction of the arrow $X_2$, in relation to the clutch claw 13 of the intermediate gear 14. By a further small movement of the ratchet gear 7 in the direction $X_2$, which can be carried out at any desired time by means of the lever 9 (Fig. 4), the flank $12a$ of the clutch claw 12 is moved out of the position shown in Fig. 7 against the flank $13b$ of the clutch claw 13, as shown in Fig. 8. In consequence, there is imparted to the clutch claw 13 a partial rotation in the direction $X_3$, which results in a corresponding angular rotation of the lever arm 15. From the lever arm 15 there is transmitted through the connecting member 17 to the lever arm 16 and the switch shaft 4 coupled to the latter a rotary movement y in a direction opposed to the movement $X_3$, the corresponding angular rotation of the crank 5 having the result that it is moved out of the dead center position it assumes in relation to the direction of the force of the spring $2a$, whereby the further switch movement of the switch shaft 4 is produced by the spring $2a$ in the direction of the arrow y. While the clutch claw 13 of the intermediate gear 14 now moves into the position shown in Fig. 9, under the force of the relaxing spring $2a$, the clutch claw 12 remains in the position determining the release of the spring $2a$, as will also be seen from Fig. 9. When the pawl 11 is disengaged from the ratchet wheel 8 (Fig. 4), the force of the pre-stressed strong spring elements $3a$, $3b$ is released, and the ratchet wheel 8 and the clutch claw 12 directly coupled to the latter undergo a rotary movement in the direction of the arrow $Z_2$. During this the clutch claw 12 rotates freely, e.g. through somewhat more than 90°, until its flank $12b$ meets the flank $13a$ of the clutch claw 13 and drives the clutch claw 13 in the direction of the arrow $Z_3$, until it resumes the basic position shown in Fig. 6. The clutch claw 13, moving back, produces a return rotation of the lever arm 15 and, by way of the intermediate member 17, a return rotation of the switch shaft 4 in the direction of the arrow w in such manner that the spring $2a$ is also tensioned again and brought back into the position shown in Fig. 6 by means of the crank 5. The spring tensioning mechanism is now ready again for a new working cycle.

It should be pointed out that the switch shaft 4 is secured by limiting parts (not shown) against continuous rotation in the direction of the arrow w.

From Fig. 11 it will also be seen how the electrolysis cells E, which are to be short-circuited as required by means of a spring tensioning mechanism according to the invention, are connected.

The contactors of the switches are electrically isolated from each other by an insulating segment 4' in the shaft 4.

What we claim is:

1. A switch operating mechanism comprising a toothed wheel, a first resilient means connected to said wheel and urging it to rotate in one direction about its axis, lever means operatively connected to said wheel for moving it in the opposite direction thereby tensioning the resilient means, a pawl engaging the teeth of said wheel to hold it against movement under the action of said tensioned resilient means said pawl being movable to release the wheel, magnetic means for controlling the release movement of said pawl, a switch shaft, switch means connected with said shaft and operated by the rotation of said shaft, connecting means between said shaft and said wheel said connecting means including a crank and a lost motion coupling, second resilient means acting on said crank and tensioned by the crank as the crank moves up to its dead centre position, said second resilient means being weaker than the first resilient means so that on release of the wheel the first resilient means rotates the wheel and the switch shaft to close the switch means against the action of the second resilient means, said second resilient means being effective after the crank is moved by the toothed wheel beyond its dead centre position to actuate the switch shaft and open the switch means during lost motion movement of the lost motion coupling.

2. A mechanism as claimed in claim 1, wherein the first resilient means consists of two springs having a common connection to the toothed wheel.

3. A mechanism as claimed in claim 1, wherein said connecting means includes a double crank device whereby the switch shaft is rotated in the opposite direction to the toothed wheel.

4. A mechanism as claimed in claim 1, wherein the lever means comprises a hand lever pivotally mounted concentrically of the toothed wheel and a pawl engaging the teeth of the toothed wheel, said pawl being operatively connected with the lever so that reciprocation of the lever operates the pawl and the latter advances the wheel step by step.

5. Mechanism as claimed in claim 1, having a spring whereby the pawl is urged into engagement with the teeth of the wheel, and said magnetic means serves to move the pawl for releasing the wheel.

6. Mechanism as claimed in claim 1, wherein the coupling comprises a pair of dogs, the first of which is carried by the wheel and the second of which is connected with the switch shaft.

References Cited in the file of this patent

UNITED STATES PATENTS

| 2,073,330 | Zingg | Mar. 9, 1937 |
| 2,100,722 | Paulson et al. | Nov. 30, 1937 |
| 2,752,452 | Rawlins et al. | June 26, 1956 |

FOREIGN PATENTS

| 20,113 | Great Britain | Nov. 30, 1937 |